United States Patent
Gupta et al.

(10) Patent No.: US 9,909,440 B2
(45) Date of Patent: Mar. 6, 2018

(54) INTERLOCKING HOLE PATTERN SEAL

(75) Inventors: Manoj K. Gupta, Houston, TX (US);
Steven Nove, Houston, TX (US);
Thomas Soulas, Houston, TX (US);
Krishnaswamy Ramesh, Katy, TX (US); Glenn Grosso, Olean, NY (US)

(73) Assignee: Dresser-Rand Company, Olean, NY (US)

( * ) Notice: Subject to any disclaimer, the term of this patent is extended or adjusted under 35 U.S.C. 154(b) by 37 days.

(21) Appl. No.: 14/005,592

(22) PCT Filed: Mar. 23, 2012

(86) PCT No.: PCT/US2012/030279
§ 371 (c)(1),
(2), (4) Date: Feb. 24, 2014

(87) PCT Pub. No.: WO2012/129475
PCT Pub. Date: Sep. 27, 2012

(65) Prior Publication Data
US 2014/0191475 A1  Jul. 10, 2014

Related U.S. Application Data

(60) Provisional application No. 61/467,294, filed on Mar. 24, 2011.

(51) Int. Cl.
*F01D 11/02* (2006.01)
*F16J 15/447* (2006.01)

(52) U.S. Cl.
CPC .......... *F01D 11/02* (2013.01); *F16J 15/4472* (2013.01)

(58) Field of Classification Search
CPC ........ F16J 15/44; F16J 15/445; F16J 15/4447; F16J 15/4472; F16J 15/4474; F16J 15/4476; F16J 15/4478
See application file for complete search history.

(56) References Cited

U.S. PATENT DOCUMENTS

| 1,810,371 A | * | 6/1931 | Baumann | F16J 15/4476 277/420 |
| 2,159,766 A | * | 5/1939 | Larrecq | F16J 15/4476 277/420 |

(Continued)

FOREIGN PATENT DOCUMENTS

| JP | 5058460 A | 5/1975 |
| WO | 2004061340 A1 | 7/2004 |
| WO | 2009092797 A1 | 7/2009 |

OTHER PUBLICATIONS

PCT/US12/30279—Notification of Transmittal of International Preliminary Report on Patentability, International Preliminary Report on Patentability, dated Apr. 1, 2014, 18 pages.

(Continued)

*Primary Examiner* — L. Susmitha Koneru

(57) ABSTRACT

A seal for a turbomachine is disclosed. The seal assembly includes a rotatable shaft having a stepped outer circumferential surface that defines one or more annular protrusions axially-spaced thereon. A seal is radially-offset from the rotatable shaft and has one or more annular recesses that extend radially-outward from the inner circumferential surface of the seal. A plurality of holes are defined in both the inner circumferential surface and the one or more annular recesses of the seal, the one or more annular recesses being axially-spaced from each other and configured to receive the one or more annular protrusions in an interlocking fit.

18 Claims, 3 Drawing Sheets

(56) References Cited

U.S. PATENT DOCUMENTS

| | | | |
|---|---|---|---|
| 3,957,277 A * | 5/1976 | Margnelli | F16J 15/4472 277/414 |
| 4,199,154 A * | 4/1980 | Mueller | F16J 15/40 277/420 |
| 5,305,509 A * | 4/1994 | Yuhara | F16J 15/406 277/347 |
| 6,155,778 A * | 12/2000 | Lee et al. | 415/116 |
| 6,273,429 B1 | 8/2001 | Dudinetz et al. | |
| 6,350,102 B1 * | 2/2002 | Bailey | F01D 5/20 415/173.5 |
| 6,612,820 B1 | 9/2003 | Staat et al. | |
| 6,682,077 B1 | 1/2004 | Letourneau | |
| 7,950,608 B2 | 5/2011 | Barnes | |
| 8,074,998 B2 | 12/2011 | Childs | |
| 8,844,936 B2 | 9/2014 | Childs | |
| 8,876,117 B2 | 11/2014 | Salameh | |
| 8,915,705 B2 | 12/2014 | Eelman | |
| 9,127,564 B2 | 9/2015 | Childs | |
| 2004/0046327 A1 * | 3/2004 | Menendez | F16J 15/4472 277/412 |
| 2004/0100035 A1 * | 5/2004 | Turnquist et al. | 277/412 |
| 2006/0267289 A1 | 11/2006 | Li et al. | |
| 2007/0069477 A1 | 3/2007 | Li et al. | |
| 2008/0080972 A1 * | 4/2008 | Bunker | 415/174.5 |
| 2008/0136115 A1 * | 6/2008 | Johnson | F01D 11/001 277/415 |
| 2009/0160135 A1 | 6/2009 | Turini et al. | |
| 2009/0304496 A1 * | 12/2009 | Maier | F04D 29/083 415/121.2 |
| 2010/0034646 A1 | 2/2010 | Magara et al. | |
| 2012/0027582 A1 * | 2/2012 | Natarajan et al. | 415/229 |
| 2014/0072415 A1 * | 3/2014 | Zheng | F01D 11/02 415/174.5 |
| 2015/0260295 A1 * | 9/2015 | McCoy | F16J 15/4474 277/303 |

OTHER PUBLICATIONS

PCT/US2012/030279—Notification of Transmittal of the International Search Report and the Written OPinion of the International Searching Authority, or the Declaration, International Search Report, Written Opinion of the International Searching Authority, dated Oct. 12, 2012, 10 pages.

* cited by examiner

INTERLOCKING HOLE PATTERN SEAL

The present application is a national stage application PCT Pat. App. No. PCT/US2012/030279, filed Mar. 23, 2012, which claims priority to U.S. Provisional Patent Application having Ser. No. 61/467,294, which was filed Mar. 24, 2011. These priority applications are incorporated by reference in their entirety into the present application, to the extent that these priority applications are not inconsistent with the present application.

BACKGROUND

Various types of seals are used in rotating equipment, e.g., compressors, turbines, etc., to prevent or minimize gas leakage through mechanical clearances at both static and dynamic locations. In dynamic locations, such as around rotating shafts, shaft seals are typically positioned between a stationary housing and the rotating shaft. Shaft seals generally define a clearance between the outer surface of the shaft and the seal itself that allows the shaft to freely rotate, but which also inherently creates a leakage path for gas across the seal as a result of the seal clearance. In a compressor, for example, the shaft seal typically separates a high-pressure region from a low-pressure region and is designed to minimize the loss of high pressure working fluid through the clearance while also not interfering with the rotation of the shaft.

Labyrinth seals are often used to minimize fluid flow across a seal differential pressure. Labyrinth seals, however, generate higher "kxy" forces (i.e., forces in the "x" direction caused by shaft displacement in the "y" direction) which cause aero excitation and can create rotor instability. Another type of seal often used in rotating equipment is a damper seal, such as a see-through hole pattern or a honeycomb seal. Although damper seals advantageously exert higher damping forces on the shaft to attenuate shaft vibration, they often require a larger clearance than the typical labyrinth seal, and therefore, are not as effective at preventing axial leakage. Also, conventional damper seals do not allow for geometry modifications of the seal structure to optimize leakage and damping effect. Furthermore, damper seals, especially of the hole-pattern type, can often become plugged, thereby increasing gas leakage.

What is needed, therefore, is a seal that overcomes the disadvantages of prior seals by efficiently restricting gas leakage, while also providing stiffness and damping to the rotating machinery.

SUMMARY

Embodiments of the disclosure may provide a seal assembly for a turbomachine. The seal assembly may include a rotatable shaft having an outer circumferential surface defining one or more annular protrusions thereon. The seal assembly may further include a seal radially-offset from the rotatable shaft and having an inner circumferential surface and one or more annular recesses extending radially-outward from the inner circumferential surface, the inner circumferential surface and the one or more annular recesses defining a plurality of holes, wherein the one or more annular recesses are configured to receive the one or more annular protrusions.

Embodiments of the disclosure may further provide a method for reducing fluid leakage from a high pressure region to a low pressure region along a rotatable shaft. The method may include rotating the rotatable shaft, the rotatable shaft having an outer circumferential surface defining one or more annular protrusions, and arranging a seal about the rotatable shaft, the seal having an inner circumferential surface and one or more annular recesses, wherein the inner circumferential surface and the one or more annular recesses define a plurality of holes. The method may further include seating the one or more annular protrusions within the one or more annular recesses, whereby a tortuous flow path is defined between the rotatable shaft and the seal for obstructing fluid leakage across the seal.

Embodiments of the disclosure may further provide another seal assembly for a turbomachine. The seal assembly may include a rotatable shaft arranged within the turbomachine and having an outer circumferential surface defining annular protrusions that are axially-spaced from each other along an axial section of the rotatable shaft. The seal assembly may also include a seal disposed about the rotatable shaft at the axial section and having an inner circumferential surface radially-offset from the rotatable shaft, the seal defining annular recesses extending radially-outward from the inner circumferential surface. Each annular recess is configured to receive at least one of the annular protrusions. The inner circumferential surface and the annular recesses define a first plurality of holes. The seal assembly may further include a gap defined between the rotatable shaft and the seal, the gap providing a tortuous flow path configured to impede working fluid leakage across the axial section from a high pressure side to a low pressure side.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
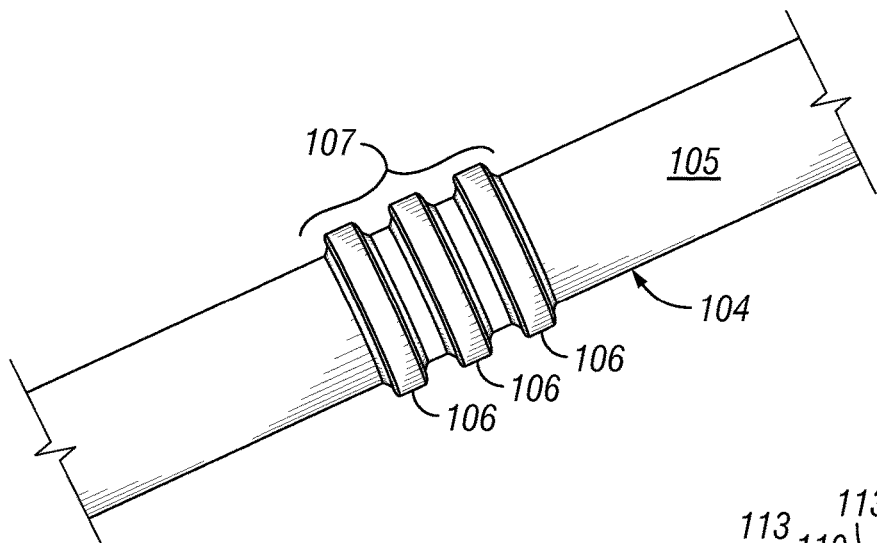
FIG. 1A illustrates an isometric view of a rotatable shaft, according to one or more embodiments described.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1B:
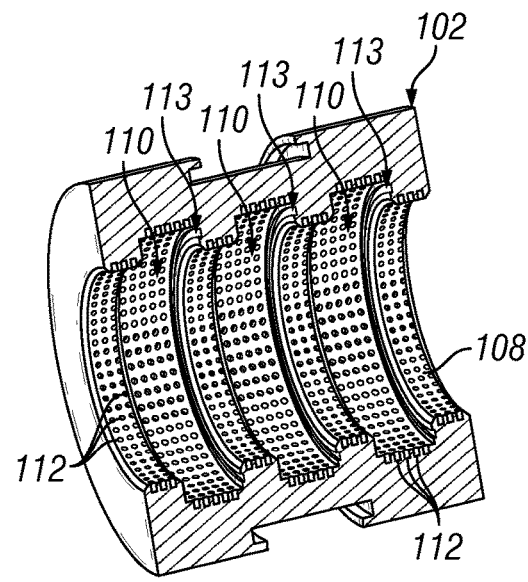
FIG. 1B illustrates a sectional view of an interlocking hole pattern seal, according to one or more embodiments described.
Figure 1C:
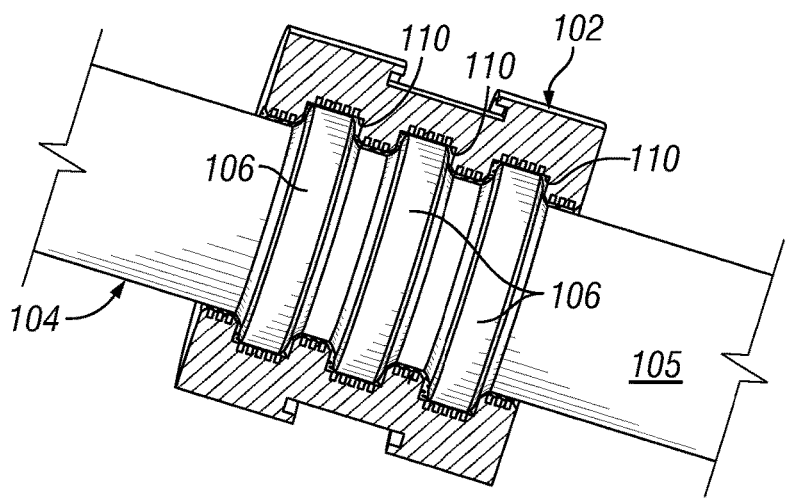
FIG. 1C illustrates a partially-broken, isometric view of an interlocking seal assembly with a rotatable shaft, according to one or more embodiments described.

FIGS. 1A-1C illustrate various components of an exemplary interlocking seal assembly 100. In one embodiment, the seal assembly 100 may be employed in a turbomachine, such as a turbo-compressor or high-speed turbine, adapted for the processing of a working fluid, such as gases and/or liquids. In other embodiments, however, the interlocking seal assembly 100 may be used in conjunction with any rotating machinery where a shaft seal is required to two pressure zones.

The interlocking seal assembly 100 may include a seal 102 (FIG. 1B) and a shaft 104 (FIG. 1A), where the seal 102 is configured to surround the shaft 104 about the entire circumference of the shaft 104. As will be described in more detail below, the seal 102 may be characterized as an interlocking hole pattern seal. Only a portion (about half) of the seal 102 is shown in FIGS. 1B and 1C for convenience, but it will be appreciated that the seal 102 may be an annulus surrounding the entire outer circumferential surface 105 of the shaft 104 along an axial section 107 of the shaft 104. The seal 102 is radially-offset from the outer circumferential surface 105 of the shaft 104, thereby providing or otherwise generating a small gap or clearance 206 (FIG. 2) between the seal 102 and the shaft 104 that allows the shaft 104 to freely rotate while in operation.

In at least one embodiment, the shaft 104 is a rotor arranged for rotation within, for example, a centrifugal compressor or a turbine. As illustrated in FIG. 1A, the outer circumferential surface 105 of the shaft 104 may be "stepped" or otherwise define one or more axially-spaced annular protrusions 106 along the axial section 107 of the shaft 104. Although a total of three annular protrusions 106 are depicted, it will be appreciated that more or less than three annular protrusions 106 may be defined without departing from the scope of the disclosure. As illustrated, the annular protrusions 106 may be equidistantly-spaced from each other. However, it is also contemplated to have annular protrusions 106 spaced at predetermined intervals and not necessarily equidistant from each other (i.e., non-uniformly spaced).

In one embodiment, the annular protrusions 106 are machined or otherwise milled into the shaft 104. In other embodiments, however, the annular protrusions 106 may be manufactured separately and secured to the outer surface of the shaft, such as by welding a metal annulus to the outer circumferential surface 105 of the shaft 104 and milling or otherwise machining (as required) the annulus and weldment to the desired machine tolerances.

Referring to FIG. 1B, the seal 102 may define an inner circumferential surface 108 and one or more annular recesses 110. As depicted, the annular recesses 110 may be axially-spaced along the axial length of the seal 102 and offset radially-outward from the inner circumferential surface 108. The recesses 110 may be adapted to correspond or otherwise align with the one or more annular protrusions 106 of the shaft 104. Accordingly, while a total of three annular recesses 110 are depicted in FIG. 1B, it will be appreciated that more or less than three recesses 110 may be defined to accommodate or otherwise receive a corresponding number of protrusions 106, without departing from the scope of the disclosure. Once disposed about the shaft 104 (as shown in FIG. 1C), the interlocking combination of the annular protrusions 106 with the annular recesses 110 serve to prevent the egress of a working fluid along the axial length of the shaft 104 through the gap 206 defined between the seal 102 and shaft 104.

In one embodiment, the seal 102 may define a plurality of holes 112 within the inner circumferential surface 108 and the annular recesses 110. Each hole 112 may be formed in a variety of shapes, such as round, polygonal, or combinations thereof, and may extend radially into the inner circumferential surface 108 and annular recesses 110. The holes 112 may be configured to provide higher damping for the shaft 104 as it rotates. Accordingly, the seal 102 may be characterized as a type of annular hole-pattern seal. It is also contemplated, and within the scope of the disclosure, to have the holes 112 defined only in the annular recesses 110 or only in the inner circumferential surface 108 of the seal 102, but not in both.

In at least one embodiment, one or more annular grooves 113 may be defined in the side surfaces of one or more of the annular recesses 110. The annular grooves 113 may be configured to reduce swirl and further reduce leakage across the seal 102. Accordingly, the grooves 113 may help improve rotordynamics.

Figure 2:
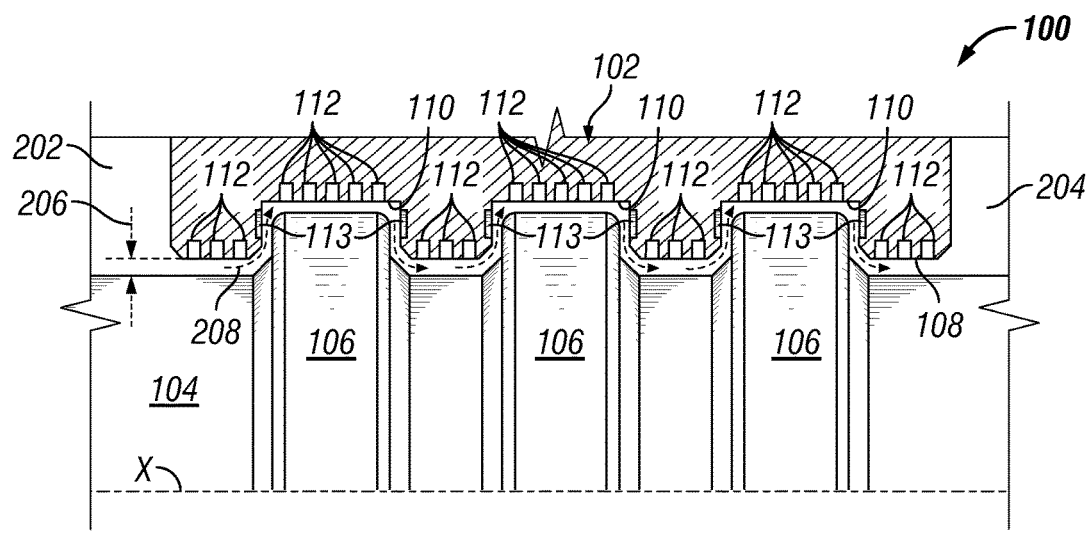
FIG. 2 illustrates a side cross-sectional view of the interlocking seal of FIG. 1C

Referring now to FIG. 2, illustrated is a side cross-sectional view of a portion of the interlocking seal assembly 100 described with reference to FIGS. 1A-1C. The seal assembly 100 separates a high pressure region or side 202 from a low pressure region or side 204 within a turbomachine (not shown) as the shaft 104 rotates about its central axis X. The seal 102 is radially-offset from the shaft 104, thereby defining the clearance or gap 206 that allows free rotation of the shaft 104. While only three holes 112 are depicted on each section of the inner circumferential surface 108 and each annular recess 110, respectively, it will be appreciated that any number of holes 112 may be defined therein, without departing from the scope of the disclosure.

Each recess 110 of the seal 102 may "interlock" and or otherwise align with a corresponding annular protrusion 106 of the shaft 104. In operation, the recesses 110 may provide a similar sealing effect as a labyrinth seal, by forcing high pressure working fluid from the high pressure side 202 to bypass a tortuous flow path 208 around the interlocking combination of the protrusions 106 and recesses 110 before leaking into the low pressure side 204. Moreover, throughout the tortuous flowpath 208, the holes 112 defined in the seal 102 dampen vibrations emanating from the shaft 104, as described above. Consequently, the interlocking seal assembly 100 optimizes surface roughness of the seal 102 (e.g., lower leakage) and surface smoothness of the shaft 104 (e.g., higher damping) in order to reduce the overall leakage through the seal 100.

The interlocking seal 100 may be implemented in various locations of a turbomachine. For example, the seal 100 may be used at the division wall in a back-to-back compressor. The seal 100 may also be used as a balance piston seal or an end gas balance seal in straight-through compressors. The seal 100 may be equally effective for use in steam turbines for sealing high pressure steam within a casing or housing.

Several advantages are obtained by using the interlocking seal assembly 100 as described herein. For example, it has been found that leakage through the interlocking seal assembly 100 can be reduced by more than 30% when compared with conventional see-through hole pattern seals as used in centrifugal compressors. This results in lower power consumption of the compressor. In some instances, the power consumption of the compressor may be reduced by more than 2%, thereby also reducing the required sizing of any intercooling equipment between compressor stages. Consequently, the interlocking seal assembly 100 may reduce greenhouse gas emissions in compressing the same amount of working fluid in the oil & gas and process industries.

The interlocking seal assembly 100 may also avoid an increase in the bearing span of the turbomachine. Also, the interlocking seal assembly 100 may eliminate the need for a convention labyrinth seal, which can generate higher "lay" forces that often result in aero excitation and machine instability.

Another advantage in using the interlocking seal assembly 100 is the reduction in required axial length for the seal. Since the interlocking seal assembly 100 combines the sealing and damping properties of both a labyrinth seal and a damper seal, the axial length of the seal assembly 100 may be reduced when compared with conventional labyrinth and hole pattern seals, but nonetheless improve rotordynamics for the turbomachine. Moreover, reducing the axial length of the seal assembly 100 may allow for a smaller frame size for the turbomachine, thereby providing a significant cost savings.

Figure 3:
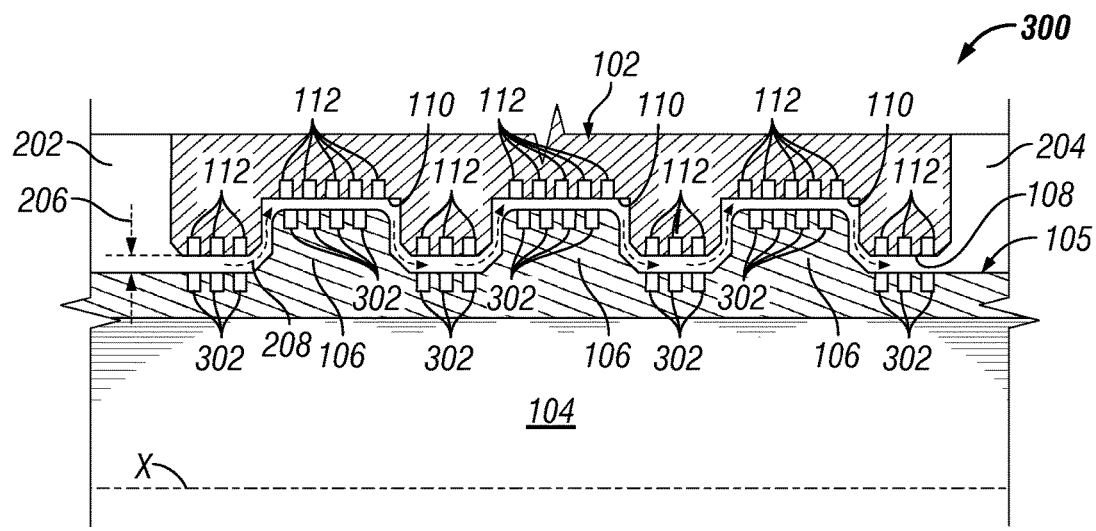
FIG. 3 illustrates a side cross-sectional view of another interlocking seal, according to one or more embodiments described.

Referring to FIG. 3, illustrated is a side cross-sectional view of a portion of another exemplary interlocking seal 300, according to embodiments disclosed. The seal 300 is similar in some respects to the seal 100 shown in FIGS. 1A-1C and 2. Accordingly, seal 300 may be best understood with reference to seal 100, where like numerals are used to designate like components. At least one distinction between seal 100 and seal 300, is that the seal 300 may include a shaft 104 defining holes 302 therein. Specifically, holes 302 may be defined in both the outside surface 105 and in the annular protrusions 106 of the shaft 104. It is also contemplated, and within the scope of the disclosure, to have the holes 302 defined only in the outside surface 105 or only in the annular protrusions 106, but not in both, or combinations thereof.

Each hole 302 may be round, hexagonal, combinations thereof, or other geometric shapes, and may extend radially into the either the outer circumferential surface 105 or the annular protrusions 106 of the shaft 104. In one embodiment, each hole 302 may be substantially similar in shape and depth as the opposing holes 112 defined in the seal 102. In other embodiments, however, the holes 302 may be different from the holes 112 in depth and/or shape. In operation, the holes 302 in the shaft 104 and the holes 112 in the seal 102 may cooperate not only to increase flow path 208 friction for the working fluid, and thereby reduce working fluid leakage through the seal 300, but also to increase shaft 104 vibration dampening capability.

Figure 4:
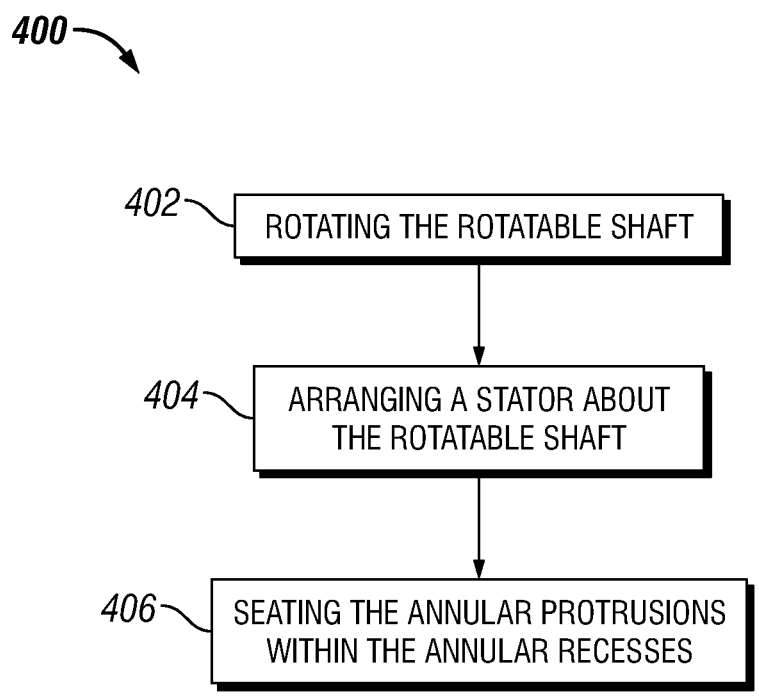
FIG. 4 is a flowchart of a method of reducing fluid leakage along a rotatable shaft of a turbomachine, according to one or more embodiments described.

Referring to FIG. 4, illustrated is a schematic method 400 for reducing fluid leakage from a high pressure region of a turbomachine to a low pressure region of the turbomachine along a rotatable shaft. The method 400 may include rotating the rotatable shaft, as at 402. In an embodiment, the rotatable shaft has an outer circumferential surface that defines one or more annular protrusions. The annular protrusions may be axially-spaced from each other along an axial section or length of the shaft. The method 400 also includes arranging a seal, such as an interlocking hole pattern seal, about the rotatable shaft, as at 404. The seal may be disposed about the shaft at the axial section of the shaft where the annular protrusions are defined, and include an inner circumferential surface and one or more annular recesses that extend radially-outward from the inner circumferential surface. The annular recesses are axially-spaced from each other. In operation, the seal is configured to separate a high pressure region from a low pressure region along the axial section of the shaft. In one or more embodiments, a plurality of holes is defined in the inner circumferential surface of the seal and also in the one or more annular recesses.

The one or more annular protrusions may be seated within the one or more annular recesses, as at 406. During operation, a gap is defined between the shaft and seal, wherein a tortuous flowpath is provided through the interlocking relationship of the annular protrusions and annular recesses. As will be appreciated, this interlocking relationship serves to impede or otherwise restrain working fluid leakage along the axial length or at the axial section of the seal.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A seal assembly for a turbomachine, comprising:
a rotatable shaft having an outer circumferential surface defining one or more annular protrusions thereon; and
a seal radially-offset from the rotatable shaft and having:
an inner circumferential surface and one or more annular recesses extending radially-outward from the inner circumferential surface, each of the one or more annular recesses bounded in part by a pair of side surfaces axially opposing one another, and the inner circumferential surface and the one or more annular recesses defining a plurality of blind holes; and an annular groove defined entirely by one of the side surfaces of at least one of the one or more annular recesses, wherein the annular groove encircles the rotatable shaft, and the one or more annular recesses are configured to receive the one or more annular protrusions.

2. The seal assembly of claim 1, wherein the one or more annular protrusions are equidistantly-spaced from each other along the rotatable shaft.

3. The seal assembly of claim 1, wherein the one or more annular protrusions are non-uniformly spaced from each other along the rotatable shaft.

4. The seal assembly of claim 1, wherein the plurality of blind holes is a first plurality of blind holes and the annular protrusions and the outer circumferential surface of the rotatable shaft define a second plurality of blind holes.

5. The seal assembly of claim 1, wherein each of the plurality of blind holes is round.

6. The seal assembly of claim 1, wherein each of the plurality of blind holes is polygonal.

7. The seal assembly of claim 1, wherein a gap is defined between the rotatable shaft and the seal.

8. A method for reducing fluid leakage from a high pressure region to a low pressure region along a rotatable shaft, comprising:
 rotating the rotatable shaft, the rotatable shaft having an outer circumferential surface defining one or more annular protrusions;
 arranging a seal about the rotatable shaft, the seal having:
 an inner circumferential surface and one or more annular recesses, each of the one or more annular recesses bounded in part by a pair of side surfaces axially opposing one another, and wherein the inner circumferential surface and the one or more annular recesses define a plurality of blind holes; and
 an annular groove defined entirely by one of the side surfaces of at least one of the one or more annular recesses, the annular groove encircling the rotatable shaft; and
 seating the one or more annular protrusions within the one or more annular recesses, whereby a tortuous flowpath is defined between the rotatable shaft and the seal for obstructing fluid leakage across the seal.

9. The method of claim 8, further comprising damping shaft vibrations with the plurality of blind holes.

10. The method of claim 8, wherein the plurality of blind holes is a first plurality of blind holes and a second plurality of blind holes is defined in the outer circumferential surface and annular protrusions of the shaft.

11. The method of claim 10, further comprising damping shaft vibrations and simultaneously reducing the fluid leakage with the first and second plurality of blind holes.

12. A seal assembly for a turbomachine, comprising:
 a rotatable shaft arranged within the turbomachine and having an outer circumferential surface defining annular protrusions that are axially-spaced from each other along an axial section of the rotatable shaft;
 a seal disposed about the rotatable shaft at the axial section and having an inner circumferential surface radially-offset from the rotatable shaft, the seal defining annular recesses extending radially-outward from the inner circumferential surface, each of the one or more annular recesses bounded in part by a pair of side surfaces axially opposing one another, and further having an annular groove defined entirely by one of the side surfaces of at least one of the annular recesses and encircling the rotatable shaft, wherein each annular recess is configured to receive at least one of the annular protrusions, and wherein the inner circumferential surface and the annular recesses define a first plurality of blind holes; and
 a gap defined between the rotatable shaft and the seal, the gap providing a tortuous flowpath configured to impede working fluid leakage across the axial section from a high pressure side to a low pressure side.

13. The seal assembly of claim 12, further comprising a second plurality of blind holes defined in the outer circumferential surface of the shaft about the axial section.

14. The seal assembly of claim 12, further comprising a second plurality of blind holes defined in at least one of the annular protrusions of the shaft.

15. The seal assembly of claim 12, further comprising a second plurality of blind holes defined on both the axial section of the outer circumferential surface of the shaft and at least one of the annular protrusions of the shaft.

16. The seal assembly of claim 15, wherein the first and second plurality of blind holes are configured to cooperate to dampen vibrations from the rotatable shaft and reduce the working fluid leakage.

17. The seal assembly of claim 12, wherein the turbomachine is a centrifugal compressor.

18. The seal assembly of claim 12, wherein the turbomachine is a steam turbine.

* * * * *